United States Patent [19]

Sato

[11] Patent Number: 4,600,509

[45] Date of Patent: Jul. 15, 1986

[54] PLATE FILTER PRESS

[75] Inventor: Nobuo Sato, Nagoya, Japan

[73] Assignee: NGK Insulators, Ltd., Japan

[21] Appl. No.: 693,990

[22] Filed: Jan. 23, 1985

[30] Foreign Application Priority Data

Jan. 31, 1984 [JP] Japan .................. 59-16740

[51] Int. Cl.⁴ .......................................... B01D 25/15
[52] U.S. Cl. ..................... 210/230; 100/199
[58] Field of Search ............... 210/224, 225, 230, 231; 100/194, 198, 199, 202

[56] References Cited

U.S. PATENT DOCUMENTS

| | | | |
|---|---|---|---|
| 3,624,778 | 11/1971 | Weber | 100/199 X |
| 3,669,273 | 6/1972 | Kurita | 210/225 |
| 4,159,249 | 6/1979 | Schotten | 210/230 |
| 4,265,749 | 5/1981 | Busse et al. | 210/230 X |
| 4,289,618 | 9/1981 | Schotten et al. | 210/225 X |
| 4,397,744 | 8/1983 | Harvo | 210/225 |
| 4,479,873 | 10/1984 | Korczykowski et al. | 210/225 X |

FOREIGN PATENT DOCUMENTS 2920385 11/1980 Fed. Rep. of Germany ...... 210/230

Primary Examiner—Richard L. Chiesa
Attorney, Agent, or Firm—Parkhurst & Oliff

[57] ABSTRACT

A plate filter press includes a number of filter plates slidably suspended on a horizontal upper frame and dogging means mounted on a chain extending above the filter plates to move together with the chain and engageable with the respective filter plates for progressively opening the filter plates so as to be spaced apart from each other. The filter press according to the invention comprises dogged bars engageable with the dogging means and located on the respective filter plates at a level substantially the same as that of slide surfaces of the filter plates slidable on the upper frame, filter plate connecting chains on the filter plates at a level substantially the same as that of the dogged bars, and stoppers on the filter plates at a level above the dogged bars, thereby preventing the filter plates from swinging and tilting.

5 Claims, 4 Drawing Figures

FIG_3

PLATE FILTER PRESS

BACKGROUND OF THE INVENTION

1. Field of the Invention

This invention relates to an improvement of a plate filter press including a number of filter plates suspended on a horizontal upper frame.

2. Description of the Prior Art

The plate filter press having suspended filter plates as above described generally comprises a chain adapted to be driven in forward and reverse directions above the filter plates. After completion of filtering, the filter plates are progressively opened one-by-one or two-by-two by a dogging mechanism secured to the chain and engageable with the respective filter plates in order to remove or drop cakes between the filter plates.

The dogging mechanism on the chain hitherto used has been so constructed to be engaged with uppermost ends of the filter plates at locations higher than slide surfaces between the filter plates and the upper frame in order to move the filter plates. During movements of the filter plates, therefore, they are likely to swing about the slide surfaces, so that there is a tendency for filter cloths extending between the filter plates to be damaged. In consideration of the swinging motion, it is necessary to provide longer distances between the filter plates than those required when the plates are opened, or to set longer time for opening the plates.

In order to avoid such disadvantages, a filter press having suspended filter plates has been proposed which comprises a plurality of slide surfaces between the upper frame and the filter plates to prevent the swinging motion of the filter plates when opening, as disclosed in U.S. Pat. No. 4,159,249 issued to Schotten. However, this filter press is complicated in construction, expensive to manufacture and difficult to maintain.

In the case of chain mechanisms of filter presses, returning distances of the chain have been controlled by means of timers in order to bring dogging means into engagement with following filter plates after completing the opening of one filter plate, as disclosed in U.S. Pat. No. 4,265,749 issued to Busse et al. Accordingly, the dogging means is prone to errors in its returned positions due to changes in speed of a motor for driving the chain. It is therefore necessary to set the returning distances longer than those required in anticipation of the errors, thereby resulting in waste time for operation and malfunctions, for example, more than a predetermined number of filter plates being inadvertently, simultaneously moved.

SUMMARY OF THE INVENTION

It is an object of this invention to provide an improved plate filter press simple in construction which eliminates all the disadvantages of the prior art above described and whose filter plates do not undergo any swinging motion when opening the plate.

It is another object of the invention to provide a plate filter press which deletes any superfluous time for operation and malfunctions.

In order to achieve these objects, the plate filter press including a number of filter plates slidably suspended on a horizontal upper frame and dogging means mounted on a chain extending above the filter plates to move together with the chain and engageable with the respective filter plates for progressively opening said filter plates so as to be spaced apart from each other, according to the invention comprises a dogged bar engageable with said dogging means and located on said respective filter plates at a level substantially the same as that of slide surfaces of said filter plates which are slidable on said upper frame.

In a preferred embodiment of the invention, each filter plate comprises filter plate connecting chains at a level substantially the same as that of the dogged bars.

In another preferred embodiment of the invention, each filter plate comprises stoppers at a level above the dogged bars for preventing the filter plate from swinging.

The invention will be more fully understood by referring to the following detailed specification and claims taken in connection with the appended drawings.

DETAILED DESCRIPTION OF THE PREFERRED EMBODIMENT

Figure 1:
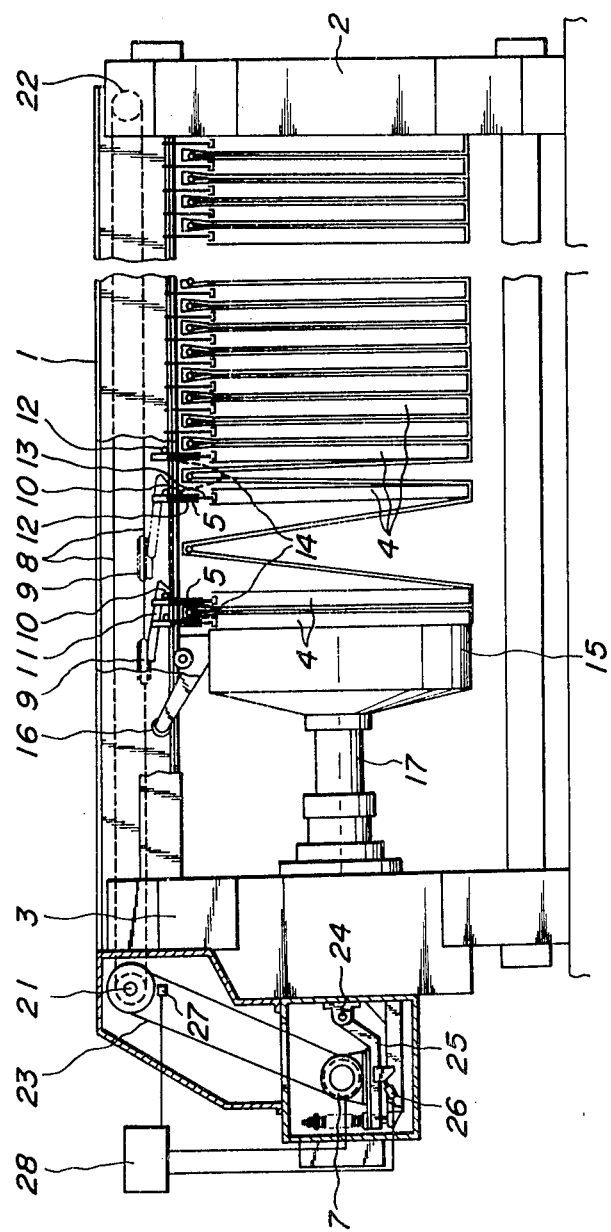
FIG. 1 is a partially removed front elevational view illustrating one embodiment of the invention.
Figure 2:
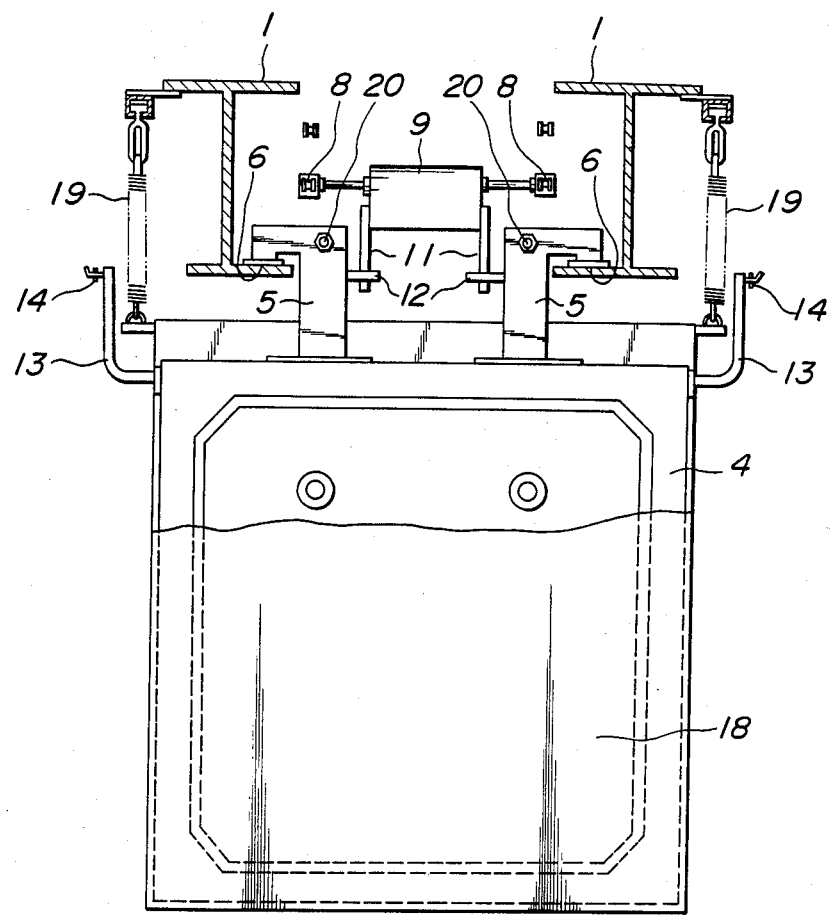
FIG. 2 is a partially removed side view showing one filter plate of the press illustrated in FIG. 1.
Figure 3:
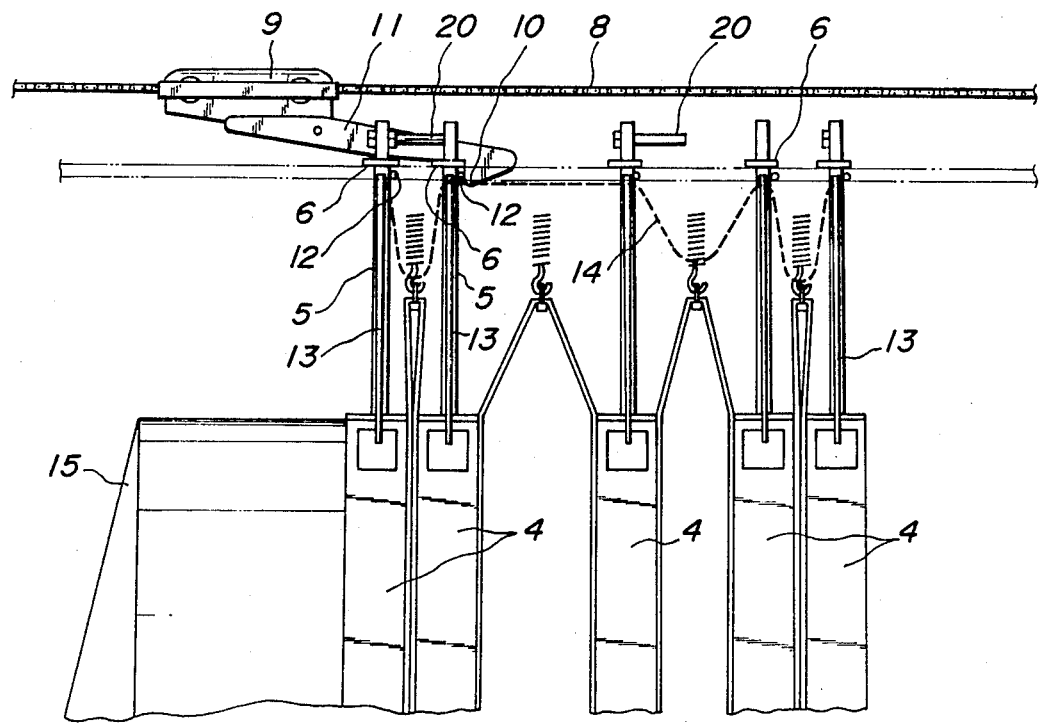
FIG. 3 is a partially removed enlarged front elevation of important parts of the press shown in FIG. 1.

Referring to the drawings, particularly FIG. 1, a plate filter press of one embodiment according to the invention comprises an upper frame 1 horizontally extending between a first frame 2 and a rear frame 3, and a number of filter plates 4 suspended slidably along the upper frame 1. Each filter plate 4 is provided on its upper end with a pair of brackets 5, each of which includes a horizontal arm extending therefrom whose lower surface defines a slide surface 6 slidable on the upper frame 1. An endless chain 8 horizontally extends above the filter plates 4 between a driving shaft 21 and a driven shaft 22 so as to be driven in forward and reverse directions by means of a reversible motor 7 and is provided with dogging or latching means 9. The dogging means 9 includes arms 11, each having at its free end a hook or dogging member 10 (FIG. 3). The brackets 5 of each filter plate 4 are provided with dogged or engaged bars 12, respectively, adapted to be engaged with the dogging means 9 at substantially the same level as that of the slide surfaces 6 slidable on the upper frame 1.

When the chain 8 moves the dogging means 9 to the left as viewed in FIG. 1 by the rotation of the driving shaft 21 in the forward or normal direction, a predetermined number of the filter plates 4 are opened by the hooks 10 of the arms 11 engaging the dogged bars 12 of the filter plate 4 as shown in solid lines in FIG. 1. Thereafter, when the chain 8 moves to the right, as viewed in FIG. 1, by the rotation of the driving shaft 21 in the reverse direction, the arms 11 ride on and beyond the dogged bars 12 of the next following filter plate with the aid of curved surfaces at the ends of the arms 11 until the hooks 10 engage the dogged bars 12.

Each filter plate 4 is provided at its upper portion of both sides with upward extending L-shaped arms 13. Each L-shaped arm 13 is provided at its upper end with a filter plate connecting chain 14 at substantially the same level as that of the dogged bars 12 for maintaining the distance between the opened filter plates at values less than a predetermined distance. When the filter plate 4 is first opened by the dogging means 9, as shown in FIG. 1, the filter plate connecting chains 14 slightly pull the following or second filter plate 4 forward so as to space apart from a further following or third filter plate, thereby facilitating the engagement of the dogging means 9 with the dogged bars 12 of the following or second filter plate when the chain 8 moves in the reverse direction and the dogging means 9 moves toward the following filter plate to the right as viewed in FIG. 1.

Figure 4:
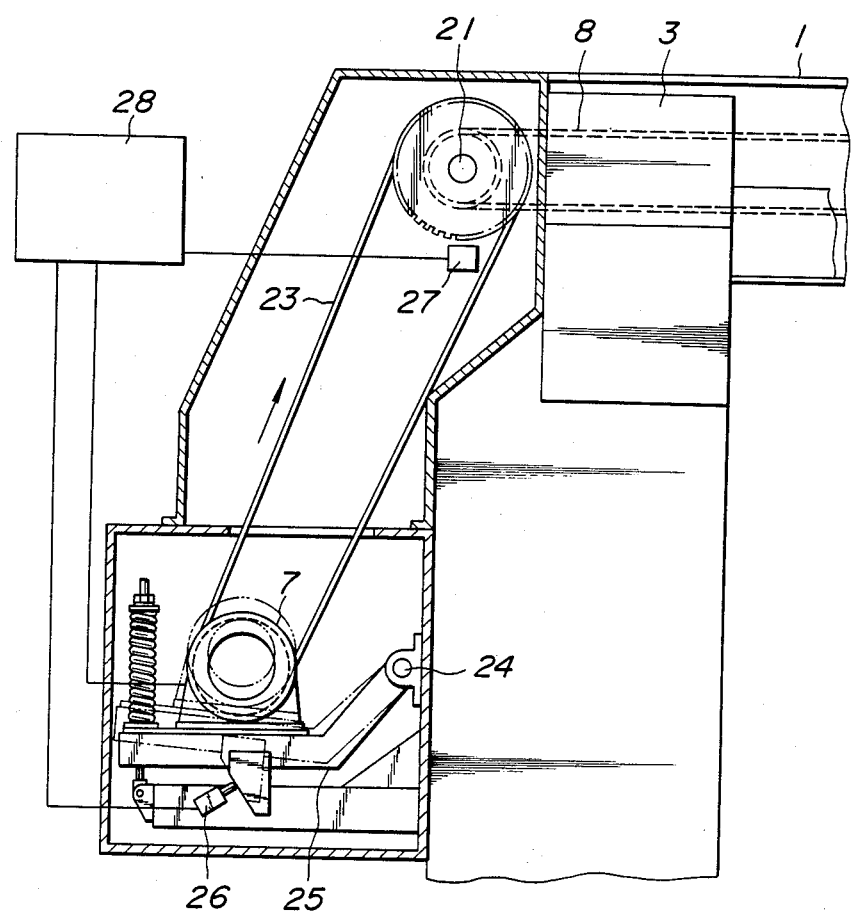
FIG. 4 is a partially removed enlarged front elevational view of important parts of another embodiment of the filter press according to the invention.

The reversible motor 7 is arranged on a movable base 25 pivotally mounted onto the rear frame 3 by means of a pin 24 rearward of the rear frame 3 for rotating the driving shaft 21 in forward and reverse directions through a chain 23. When the dogging means 9 has moved the filter plate 4 to a position where it is in contact with the preceding filter plate 4 and the chain 8 and the driving shaft 21 have been stopped, the reversible motor 17 still continues its rotation. This continuation of the rotation causes the reversible motor 7 itself to raise upward as shown in dot-and-dash lines in FIG. 4, so that a limit switch 26 provided below the movable base 25 is operated to stop the reversible motor 7 and after a few seconds to change the rotation of the motor to the reverse rotation. As a result, the chain 8 begins to move in the reverse direction and hence the dogging means 9 moves to the right, as viewed in FIG. 1, to engage the following filter plate 4.

The driving shaft 21 comprises a revolution counter 27, such as a pulse generator, for generating pulses corresponding to rotating angles of the driving shaft 21 in the reverse direction. The counter 27 may be a combination of a disk having an aperture fixed to the driving shaft 21 and a photoelectric tube which generates pulses as outputs resulting from intermittent light beams produced dependently upon the rotations of the driving shaft 21 or a combination of a toothed disk fixed to the driving shaft 21 and a contactless switch for generating pulses therefrom or of any other type.

In the case of the pulse generator as the counter, the pulses are counted by a preset counter built into a controller 28. When a predetermined number of the pulses have been counted by the counter, the reversible motor rotating in the reverse direction is stopped by the controller 28 to stop the dogging means 9 in place.

Moreover, this filter press comprises a loose head 15 suspended on the upper frame 1 by means of rollers 16 on the left side of an array of the filter plates as viewed in FIG. 1, a hydraulic cylinder 17 for driving the loose head 15 to compress the filter plates toward the first frame 2 in filtering, filter cloths 18 extending in tension between the filter plates 4, and coil springs 19 for raising upper ends of the filter cloths toward the upper frame 1. A reference numeral 20 denotes horizontally extending stoppers at a level higher than that of the slide surfaces 6 of the brackets 5 of the filter plates 4 slidable on the upper frame 1. An operation of the stoppers 20 will be explained later.

With this arrangement, the hydraulic cylinder 17 is actuated so as to move the loose head 15 to the right as viewed in FIG. 1 to compress the number of the filter plates 4 slidably suspended from the horizontal upper frame 1 toward the first frame 2, and a liquid to be filtered or slurry is then introduced into spaces between the filter plates 4 to effect the filtering. After completion of the filtering, the loose head 15 is returned to the position shown in FIG. 1 and the number of the filter plates 4 slidably suspended from the horizontal upper frame 1 are then opened in succession by the dogging means 9 of the chain 8 driven by the reversible motor 7 and engaging the dogged bars of the filter plates 4, so that cakes adhering to the filter cloths 18 extending therebetween are removed or dropped.

As can be seen from the above description of the invention, the dogged bars, which are adapted to engage the dogging means, are provided at substantially the same level as that of the slide surfaces 6 of the respective filter plates 4 slidable on the upper frame 1, thereby eliminating any rotating moment acting upon the filter plates 4 in the movements of the plates to completely avoid the swinging of the filter plates 4. As described above, when the filter plates have been sufficiently opened, the following filter plate 4 is pulled and moved forward a small amount by the filter plate connecting chains 14. The filter plates 4 do not undergo any swinging motion because the filter plate connecting chains 14 are also located at a level which is substantially the same as that of the dogged bars 12. Furthermore, even when the filter plate 4 has been engaged by the dogging means 9 and has been moved to the position where it is about to contact with the already opened filter plate, the filter plates 4 scarcely tilt because they are provided with the swinging preventing stoppers 20 at locations above the slide surfaces 6.

According to the invention, the extreme position of traveling of the dogging means 9 in the forward direction for opening the filter plates by the reversible motor is controlled by the limit switch 26, and the rotated numbers of the driving shaft 21 in the reverse direction are counted by the revolution counter 27. When the counted numbers have arrived at predetermined values, the reversible motor 7 rotating in the reverse direction is stopped by the controller 28. In this manner, the traveling distance of the chain 8 in the reverse direction to bring the dogging means 9 into engagement with the following filter plate 4 can be precisely controlled.

Assuming, for example, that a radius of a pitch circle of a sprocket fixed to the driving shaft 21 for the chain 8 is 150 mm and a pulse generator generating 360 pulses per one revolution of the driving shaft 21 is used as the revolution counter 27, the moving distance of the chain 8 per one pulse is about 2.7 mm. As can be seen from this value, the returned positions of the dogging means can be controlled with high accuracy. Accordingly, it is not necessary to set returning distances of the chain 8 to be longer than actually required distances in anticipation of unavoidable errors in the prior art. Moreover, the time required to open the filter plates 4 can be reduced by 10–15% of the time required in the prior art, and malfunctions of the filter, for example, more than a predetermined number of filter plates being simultaneously, inadvertently displaced can be avoided.

While the invention has been particularly shown and described with reference to preferred embodiments thereof, it will be understood by those skilled in the art that the foregoing and other changes in form and detail can be made therein without departing from the spirit and scope of the invention.

What is claimed is:
1. A plate filter press comprising:
a horizontal upper frame;
a plurality of filter plates suspended from said horizontal upper frame, said filter plates having at least one sliding surface which contacts said horizontal upper frame;

a driving chain located above said filter plates and extending along said horizontal upper frame;

a dogging means for contacting said filter plates, said dogging means being fixed to said driving chain; and dogged bars fixed to said filter plates at a horizontal level which is substantially the same as said at least one sliding surface, said dogging means contacting said dogged bars to separate progressively said filter plates resulting in said filter plates being spaced apart from each other.

2. A plate filter press as set forth in claim 1, wherein said driving chain located above said filter plates is driven by a reversible motor, said reversible motor comprising a movable base upon which said reversible motor is fixed, said movable base being pivotally connected to a frame of the filter press, wherein said pivotal base pivots when at least one of said plurality of filter plates is displaced to a position where said at least one filter plate contacts a previously displaced filter plate and the driving chain has stopped moving, and a limit switch which is activated by said pivotal base pivoting, said limit switch deenergizing said reversible motor.

3. A plate filter press as set forth in claim 1, wherein each of said filter plates further comprises filter plate connecting chains, which are fixed to said filter plates at a horizontal level which is substantially the same as that of said dogged bars.

4. A plate filter press as set forth in claim 1, wherein each of said filter plates comprises stoppers, which are located at a horizontal level above said dogged bars, said stoppers preventing the filter plates from swinging.

5. A plate filter press as set forth in claim 1, wherein said driving chain located above said filter plates is driven by a reversible motor and said press further comprises a revolution counter provided on a driving shaft for said driving chain, and a controller for stopping said reversible motor while moving said dogging means toward the following filter plate when revolution members counted by said revolution counter have arrived at predetermined values.

* * * * *